A. R. LOCKE.
Road or Railway Carriage.
No. 106,378.  Patented Aug. 16, 1870.
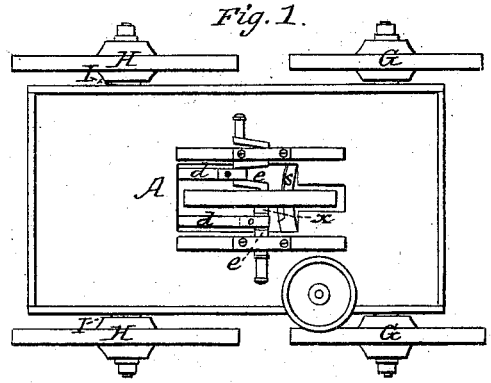
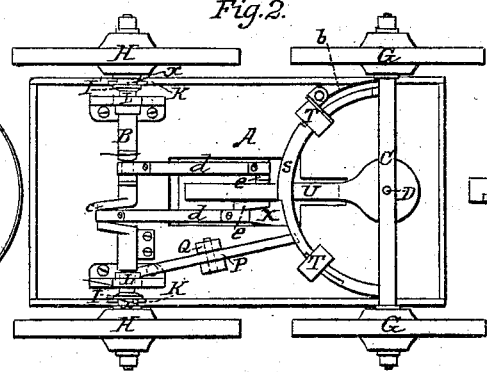 
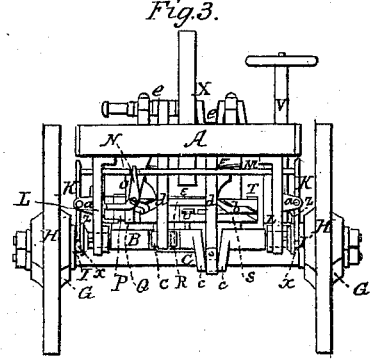 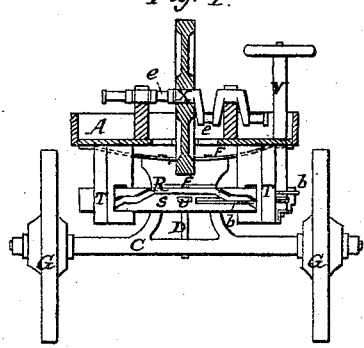
Witnesses.
S. N. Piper.
J. R. Snow.
Inventor,
Aaron R. Locke.
by his attorney.
R. H. Eddy.

ated August 16, 1870.

UNITED STATES PATENT OFFICE.

AARON R. LOCKE, OF BOSTON, MASSACHUSETTS.

IMPROVEMENT IN RAILWAY-CARRIAGES.

Specification forming part of Letters Patent No. 106,378, dated August 16, 1870.

*To all whom it may concern:*

Be it known that I, AARON R. LOCKE, of Boston, in the county of Suffolk and State of Massachusetts, have made a new and useful invention having reference to Railway and Common Road Carriages; and I do hereby declare the same to be fully described in the following specification and represented in the accompanying drawings, making part thereof, and of which—

Figure 1 is a top view, Fig. 2 an under side view, Fig. 3 a rear elevation, and Fig. 4 a transverse section, of a carriage furnished with my said invention, the last-named figure being made so as to exhibit the cam-grooves of the curved slide-bar, which is supported by an arm projecting from the front axle.

In carrying out my invention I combine with the front axle (pivoted to the carriage-body so as to turn in a horizontal plane) and with the rear or driving axle a mechanism for clutching the wheels of such driving-axle to it, and unclutching them from it during the turning of the front axle in either direction, the object of my invention being to enable the carriage to turn quick or sharp curves to advantage, and one of the rear wheels, while remaining on the curves, to revolve independently of the driving-axle, such wheel, while the carriage may be running in a straight path, being so clutched to the axle as to be revolved by it. The wheel so unclutched is that which, while the carriage may be on the curve, may be on the outside or longer rail or wheel-path. By allowing it to run independently of the other or fellow wheel and the driving-axle, while the latter are in conjunction and both wheels are on a curved track, the inner wheel will not slip on the track, but both wheels will readily conform themselves to the length of curve each has to pass over.

In the drawings, A denotes the carriage-body; B, the rear or cranked driving-axle, and C the front or guiding axle. The latter axle is held to the carriage by, or turns horizontally on, a king-bolt or transom-bolt, D, which extends downward from a bearing, E, supported by a spring, F, fixed to the carriage-body. The wheels G G of the front axle are to revolve freely thereon. The same may be said with respect to those, H H, of the rear axle when they are not clutched thereto. Each of the wheels H has applied to it and the axle one of two clutches, I I', whose movable parts $x\ x$ are connected to the axle by a feather connection, and are adapted to slide endwise on it in the usual way, in which the movable part of a clutch is applied to its shaft. The said movable part of each clutch has a furcated lever, K, for operating or sliding it lengthwise on the axle. The two furcated levers of the clutches are represented in Fig. 3 of the drawings as pivoted at $a\ a$ to the two axle-box hangers L L, extended downward from the carriage-body.

Fig. 5 is a section taken through one of the rear wheels and its clutch, the fixed part $y$ of the clutch being formed in the hub of the wheel, and the movable part $x$ being applied to the axle in manner as hereinbefore mentioned. A clutch being a mechanical contrivance well understood by mechanicians, it will not be necessary for me to give a further description of it. A spring, $z$, applied to the furcated lever of each clutch serves to maintain the wheel clutched to the rear axle when the other wheel is out of engagement therewith. Between the longer arms of the said levers K K is a rod, M, which slides freely in holes in the hangers, and is jointed to, or suitably applied to, one arm of a bent lever, N, pivoted to a hanger, O. The other arm of the bent lever extends between the prongs of a long forked lever, P, arranged and pivoted to a projection, Q, disposed as shown in the drawings. The front arm of the lever P enters a cam-groove, R, made in a curved slide-bar, S. (See Fig. 6, which is a view of the rear side of the said bar and such groove.) The bar S slides horizontally through guides T T extending down from the carriage-body, and at its middle such curved bar is fixed to an arm, U, extended from the front axle.

A hand-wheel shaft, V, arranged in the body in manner as represented, has two lines or chains, $b\ b$, wound about it in opposite directions, and fixed at their outer extremities to the curved bar S. By revolving the hand-wheel shaft the said curved cam-groove bar S may be moved in either direction, so as to turn the front axle obliquely, either to the right or to the left, with respect to the carriage-body. When the axle is so turned far enough in either direction the rear wheel on the outside curve or rail will be unclutched from the axle, while the fellow rear wheel will be preserved in engagement with and so as to be revolved by the rear axle. The said rear axle is represented as provided with two bell-cranks, $c\ c$, jointed to two connecting rods, $d\ d$, proceeding from two other bell-cranks, $e\ e$, of a driving-shaft, X.

I claim as my invention—

1. The combination of the two clutches and their operative mechanism, substantially as described, or the equivalent thereof, with the wheels and the two axles, applied together and to the carriage-body, essentially as hereinbefore explained, the purpose of the clutches and their operative mechanism being as hereinbefore described.

2. The mechanism or combination, as explained, for operating the sliding parts of the clutches I I', the same consisting of the cam-grooved curved bar S, fixed to an arm, U, projecting from the front axle, the levers N P, the slide-rod M, and the springs $z\ z$, and the furcated levers K K of the sliding parts $x\ x$ of the clutches, the curved bar being provided with mechanism for moving it in its guides, as set forth.

AARON R. LOCKE.

Witnesses:
R. H. EDDY,
J. R. SNOW.